UNITED STATES PATENT OFFICE 2,487,099

TREATMENT OF POLYMERIZED CHLORO-SUBSTITUTED ETHYLENES

Charles J. Chaban, Toledo, Ohio, assignor, by mesne assignments, to Stabelan Chemical Company, Toledo, Ohio, a partnership No Drawing. Application June 11, 1945, Serial No. 598,899

2 Claims. (Cl. 260—45.7)

The invention relates to the treatment of polymerized chloro-substituted ethylenes intended for use in various products such as transparent, translucent, uncolored, dyed, pigmented or filled films, coatings, filaments and moldings, and particularly to the incorporation, with polymerized chloro-substituted ethylenes of agents that improve their stability and durability.

One of the principal limitations on the usefulness of polymerized chloro-substituted ethylenes is their limited resistance to light and heat and their limited stability or durability when subjected to flexing, abrasion or outdoor exposure. Polymerized vinyl chloride, for example, when subjected to outdoor exposure or to an accelerated weathering test or a carbon arc fadeometer test, turn brown or black and become brittle in a relatively short time, particularly when they consist of transparent or translucent films or filaments which are not protected by the opacifying action provided by the presence of fillers or pigments.

Many substances have been suggested as stabilizing agents for such compositions, but they have produced only a relatively slight improvement in their properties.

The principal object of the invention is to produce a very marked improvement in the light resistance, heat resistance, weather resistance, abrasion resistance and resistance to flexing both at ordinary temperatures and at subnormal temperatures of polymerized chloro-substituted ethylenes. More specific objects and advantages are apparent from the description, which merely discloses and illustrates the invention and is not intended to impose limitations upon the claims.

When the present treatment is practiced upon polymerized chloro-substituted ethylenes it is carried out after polymerization of such compounds. The present method of improving the properties of polymerized chloro-substituted ethylenes is practiced by incorporating therewith one or more hydrated perborates of an alkali metal.

Although the presence of such a perborate in a polymerized chloro-substituted ethylene produces a very marked improvement in the properties of such substances, it does not produce a violent effect like the presence of a catalyst during the polymerization of an unsaturated compound. Peroxides have been used as catalysts in the polymerization of unsaturated compounds, but in order to prevent the polymerization from becoming too violent and to prevent inferior polymers from being produced they are used during the polymerization in a concentration that is only a small fraction of the concentration of the agent used in the present method which gives an appreciable improvement in the properties of the composition to which it is added. Although the concentration of a polymerization catalyst is minute as compared with the concentration of the agent used in the present method, it heretofore has been thought to be desirable to remove even the relatively small trace of polymerization catalyst that remains after the polymerization.

The present method is particularly useful in improving the properties of the product of the polymerization of a composition that comprises an alpha-halo-substituted ethylene having from one to two alpha-halo substituents, such as vinyl chloride or vinylidene chloride, or comprises both vinyl chloride and vinylidene chloride, with or without a vinyl ester such as vinyl acetate.

The perborates that may be used in the practice of the present invention include the perborates sodium and potassium, i. e., alkali metals having an atomic weight between 20 and 40.

It is desirable to use agents containing water of crystallization, i. e., hydrated perborates. For example, in practicing the present invention, $NaBO_2 \cdot H_2O_2 \cdot 3H_2O$ can be dispersed in a vinyl halide resin on a rubber mill to produce a transparent composition that forms a clear film, and such a milling process is the conventional method of compounding vinyl halide films.

The agents used in the practice of the invention may be of any good commercial grade. The agents usually appear to interact to some extent with the resin in that the water soluble agents ordinarily are relatively inextractable by water after being dispersed in the resin.

The total proportion of the agents usually is from about 1 per cent to about 10 per cent of the weight of the finished composition. Even larger proportions of the agents may be employed, but usually are not necessary. Successive increases in the proportions of the agents ordinarily produce smaller and smaller improvements in the material. Different proportions of different agents must be added to the same composition in order to give the same results. Also the proportion of a given agent to be added to the same composition in order to produce the same results varies with the degree to which the agent is dispersed in the composition, because the effectiveness of the agent ordinarily increases with the degree of dispersion. When a product of extremely high quality is required for heavy duty service, the proportions of the agents may be increased.

The incorporation of the agents in the practice of the present invention may take place at ordinary temperatures, but the agents usually appear to be more effective when incorporated at an elevated temperature. The temperature of incorporation may be any temperature that the composition will stand.

The incorporation of the agents may be carried out at ordinary temperatures by means of a ball mill when the composition is in solid form or by means of any desired dispersing apparatus when the composition is in liquid form or in the form of a liquid solution or dispersion. Most of the compositions are solids at ordinary temperatures and it ordinarily is most convenient to incorporate the agents at an elevated temperature at which the composition is soft enough to be worked but viscous enough to keep the agents in suspension. Any desired apparatus, such as a two-roll rubber mill, a Banbury mixer, a ball mill or a three-roll paint mill may be used for incorporating the agents in the composition. The period of time required to incorporate the agents is simply that necessary to disperse the agents in the composition to the desired degree. If the incorporation is carried out at ordinary temperatures, the properties of the product sometimes may be improved by holding the product at an elevated temperature after the incorporation of the agents. The time required for such a heat treatment decreases as the temperature increases and depends upon whether it is desired to impart the best possible properties to the product or to impart intermediate properties by a shorter heat treatment.

A demonstration of the improvement produced in the practice of the invention may be made by milling for ten minutes on a two-roll rubber mill at 240° F. five parts by weight of $NaBO_2.H_2O_2.3H_2O$ and 147 parts of a composition consisting of 100 parts of a copolymer of 90 per cent of vinyl chloride with 10 per cent of vinyl acetate, 45 parts of dioctyl phthalate and two parts of diethylene glycol monostearate. If the resulting product is then calendered at the same temperature into a sheet .009 inch in thickness, the sheet is non-tacky, and is much tougher and has a higher thermal yield point and better dimensional stability than a sheet that is made by a procedure that is the same except that the $NaBO_2.H_2O_2.3H_2O$ is omitted. A sheet containing $NaBO_2.H_2O_2.3H_2O$ thus produced is substantially unchanged in color, transparency and flexibility after 700 hours of exposure in a standard fadeometer. Such a sheet also is unchanged by 900 hours of exposure in a standard accelerated weathering unit. If instead of being calendered into a sheet the composition containing $NaBO_2.H_2O_2.3H_2O$ is formed into pieces by molding or extrusion, the resulting pieces have similar superior resistance.

The improvement in the resistance of a composition to abrasion and to flexing and folding at ordinary and reduced temperatures produced by treating it in accordance with the present invention may be demonstrated by milling for ten minutes on a two-roll rubber mill at 240° F. two parts by weight of $NaBO_2.H_2O_2.3H_2O$ and 267 parts of a composition consisting of 100 parts of a similar copolymer of vinyl chloride and vinyl acetate, 42.5 parts of the ester of one molecule of phthalic acid with two molecules of diethylene glycol monoethyl ether, 15 parts of dibutyl sebacate, 75 parts of calcium carbonate, 25 parts of red ferric oxide, .6 part of phenyl salicylate, 5 parts of basic lead carbonate, 2.5 parts of a high-melting synthetic wax and 1.5 part of calcium stearate. If the resulting product is then calendered at 220 to 240° F. on sateen, having a weight of 9.7 ounces per square yard, to a finished fabric weight of 19.5 ounces per square yard, the resulting coated fabric does not crack when bent sharply at —28° F. When a sample of the coated fabric is subjected to 1500 cycles of abrasion in a Wyzenbeek and Staff abrasion machine, using No. 240 carborundum paper at two pounds of pressure and six pounds of tension, merely the surface of the coating is scratched and the thickness after abrasion is .022 inch. Samples of the same coated fabric are unchanged after 500,000 flexes in a standard flexing machine or after 141,000 folds in a standard folding machine. In contrast, a coated fabric prepared by a procedure that is the same as the foregoing except that the $NaBO_2.H_2O_2.3H_2O$ is omitted cracks when sharply bent at —12° F., is abraded to the fabric by the same abrasion test, with a thickness of .015 inch after abrasion, fails at 500,000 flexes in the same flexing machine and fails at 87,600 folds in the same folding machine.

The improvement in the light resistance and heat resistance of a material produced by treating it in accordance with the present invention may be demonstrated by milling for ten minutes on a two-roll rubber mill at 240° F. ten parts by weight of $NaBO_2.H_2O_2.3H_2O$ and 147 parts by weight of a composition consisting of 100 parts of a similar copolymer of vinyl chloride and vinyl acetate, 45 parts of dioctyl phthalate and two parts of diethylene glycol monostearate. If the resulting product is then calendered at the same temperature into a sheet .009 inch in thickness, the sheet has very good transparency and requires 970 hours of exposure in a standard fadeometer in order to reach the same degree of discoloration and brittleness as is reached in 150 hours of such exposure by a sheet prepared by a procedure that is the same except that the $NaBO_2.H_2O_2.3H_2O$ is omitted.

A demonstration of the effect of the present process upon a composition consisting of 100 parts by weight of a copolymer of about 95 per cent of vinyl chloride with about 5 per cent of vinyl acetate, 50 parts of dioctyl phthalate, two parts of blown castor oil, two parts of diethylene glycol monostearate, one part of phenyl salicylate and 12.5 parts of a sebacic acid polyester may be made by preparing a sheet .009 inch in thickness in the manner hereinbefore described from such composition and five parts of $NaBO_2.H_2O_2.3H_2O$. A sheet so prepared must be exposed in a standard fadeometer about ten times as long (650 hours) as a sheet similarly prepared from the same composition from which the $NaBO_2.H_2O_2.3H_2O$ has been omitted, in order to cause discoloration and excessive loss of initial flexibility. If three parts instead of five parts of $NaBO_2.H_2O_2.3H_2O$ are used in making the sheet it can be exposed only about two-thirds as long in a standard fadeometer without discoloration and excessive loss of initial flexibility. The results are similar when a vinyl chloride polymer or a copolymer of about 90 per cent of vinyl chloride with about 10 per cent of vinylidene chloride is used instead of a copolymer of vinyl chloride and vinyl acetate.

The effect of the present process upon the weather resistance of a material may be demonstrated by preparing an opaque sheet .009 inch in thickness in the manner hereinbefore described from a composition consisting of 100 parts by weight of a copolymer of about 90 per cent of vinyl chloride with about 10 per cent of vinyl acetate, 45 parts of dioctyl phthalate, five parts of blown castor oil, two parts of diethylene glycol monostearate and two parts of red iron oxide, together with two parts of $NaBO_2.H_2O_2.3H_2O$. A sheet so prepared may be exposed in a standard accelerated weathering unit for 565 hours before it turns black and stiffens. If the

$NaBO_2.H_2O_2.3H_2O$ were omitted in the preparation of this sheet it would turn black after about 150 hours and become very stiff after about 230 hours of exposure in the accelerated weathering unit. A translucent sheet prepared by a procedure that is the same as the foregoing except that .5 part by weight of an organic red pigment is used instead of the red iron oxide can be exposed for 565 hours in the accelerated weathering unit before it stiffens slightly and becomes slightly brittle around the edges, with no change in color. If the

$NaBO_2.H_2O_2.3H_2O$ is omitted from the latter sheet it cracks on bending after 100 hours and turns dark brown after 230 hours of exposure in the accelerated weathering unit.

The action of the agents used in the practice of the present invention is believed to be due in part to the ability of such agents to react with nascent oxygen. The agents are believed to react with nascent oxygen by themselves giving up oxygen which combines with the nascent oxygen present to produce molecular oxygen. Such elimination of nascent oxygen from a resin is believed to improve the properties of the resin because nascent oxygen, which may be produced by heat and light from molecular oxygen that has entered the resin from the atmosphere, has a tendency to rupture a resin chain in which a double bond may occur, with the formation of aldehyde or even carboxylic acid groups at the broken ends of the chain. The presence of such broken chains in the resin impairs the properties of the resin and causes it to discolor more readily under the influence of heat and light. Thus, by such action of the agents used in the practice of the invention, nascent oxygen, as it is formed from molecular oxygen by the action of heat and light, is reconverted into molecular oxygen, which per se is believed to be harmless, and the resin is protected for a considerable period of time against the degrading effect of nascent oxygen. The perborates may also combine with chain molecules containing double bonds to produce branch- or cross-polymerization which inhibits the rupturing action of nascent oxygen.

The agents used in the present invention may also cause further polymerization to take place after they are incorporated with resin molecules of various chain lengths. Such further polymerization may cause the chain molecules to approach a uniform, equilibrium length which gives the resin improved properties. Such equalization of the lengths of the chains may take place by polymerization or combining of the short chains and depolymerization or shortening of the long chains.

The agents used in the practice of the present process are alkaline and are believed to have an additional beneficial effect because of their alkalinity. This additional beneficial effect is to neutralize acidity such as the acidity produced by the formation of carboxylic acid groups at the broken ends of the chains when rupturing by the action of nascent oxygen has taken place. Formation of acidity may occur also in the case of vinyl halide polymers and copolymers when a hydrogen molecule and a halogen molecule are split off from two adjacent carbon atoms to form a hydrogen halide molecule, leaving a double bond between the two adjacent carbon atoms. The formation of such double bonds causes darkening of a resin and may lead to rupturing of the resin molecules as explained hereinbefore. The neutralization of such acidity is believed to be beneficial because acidification of the resins is believed to cause auto-acceleration of the degradation reactions by which the acidity is produced. The beneficial action of the agents used in the practicing of the invention cannot be explained on the ground of alkalinity alone, however, because the improvement produced by the incorporation of the present agents is far greater than improvement that can be produced by the mere incorporation of an alkaline substance.

*Example 1*

A transparent composition is prepared by dispersing from about four to about six parts by weight of one of the aforementioned perborates in 100 parts of one of the aforementioned transparent plastic polymerized chloro-substituted ethylenes by mixing the perborate in finely divided form with the plastic on a two-roll rubber mill at the softening temperature of the plastic. Also incorporated with the plastic may be any of the usual plasticizers which are compatible with the plastic, e. g., esters and other derivatives of phosphoric, phthalic, sebacic, glycolic, oleic, ricinoleic, toluenesulfonic, stearic and synthetic fatty acids, and polymeric materials such as alkyd resins, butadiene-acrylonitrile copolymers and other natural and synthetic resins, as well as any of the usual lubricating and dispersing agents, e. g., esters, metal salts and other derivatives of stearic, ricinoleic and synthetic fatty acids, such as diethylene glycol monostearate, propylene glycol polyricinoleate, the stearate of the methyl ether of ethylene glycol, and butyl stearate, oils and their modifications and derivatives such as castor oil, blown castor oil, and mineral oils, natural and synthetic waxes, and polyethylene glycols. Plasticizing, lubricating and dispersing agents may be incorporated at the same time as the perborate and those which are liquids may be incorporated also by stirring in while the plastic is fused. A transparent composition so prepared may be used, like other transparent plastic compositions, as a molding composition for fabrication by injection, compression, extrusion and the like, or as a composition for coating metals or for coating, bonding or impregnating textiles, paper, wood, leather and other materials, or may be used for the production of fibers, filaments and the like.

*Example 2*

Filled and pigmented compositions are produced by incorporating in the plastic, at the same time as the perborates, fillers and pigments such as calcium carbonate, silicates, clay, barium sulfate, carbon black, wood flour, calcium sulfate, iron oxides, iron blues, chromium yellows, chromium greens and other inorganic and organic fillers and coloring materials. Filled and pigmented compositions so prepared may be used to produce opaque or translucent coatings, moldings, extrusions, fibers, filaments and the like.

Various embodiments of the invention may be devised to meet various requirements.

Having described my invention, I claim:

1. A method of improving the properties of the product of the polymerization of a composition comprising an alpha-chloro substituted ethylene having from one to two alpha-chloro substituents that comprises intimately incorporating $NaBO_2.H_2O_2.3H_2O$ therewith, after completion of the polymerization thereof, in an amount from about 1 to about 10 per cent of the weight thereof.

2. A method of improving the properties of the product of the polymerization of a composition comprising an alpha-chloro substituted ethylene having from one to two alpha-chloro substituents that comprises intimately incorporating therewith, after completion of the polymerization thereof, a hydrated perborate of an alkali metal, in an amount from about 1 to about 10 per cent of the weight thereof.

CHARLES J. CHABAN.

REFERENCES CITED

The following references are of record in the file of this patent:

UNITED STATES PATENTS

| Number | Name | Date |
| --- | --- | --- |
| 2,356,091 | Roedel | Aug. 15, 1944 |
| 2,422,153 | Van Nimwegen | June 10, 1947 |